US010747535B1

(12) United States Patent
Reddy et al.

(10) Patent No.: US 10,747,535 B1
(45) Date of Patent: Aug. 18, 2020

(54) HANDLING NON-CACHEABLE LOADS IN A NON-COHERENT PROCESSOR

(71) Applicant: Apple Inc., Cupertino, CA (US)

(72) Inventors: Mahesh K. Reddy, Austin, TX (US); Matthew C. Stone, Austin, TX (US)

(73) Assignee: Apple Inc., Cupertino, CA (US)

(*) Notice: Subject to any disclaimer, the term of this patent is extended or adjusted under 35 U.S.C. 154(b) by 273 days.

(21) Appl. No.: 15/207,115

(22) Filed: Jul. 11, 2016

(51) Int. Cl.
*G06F 9/30* (2018.01)
*G06F 12/0815* (2016.01)
*G06F 12/0842* (2016.01)
*G06F 12/084* (2016.01)
*G06F 12/0875* (2016.01)

(52) U.S. Cl.
CPC ........ *G06F 9/30043* (2013.01); *G06F 12/084* (2013.01); *G06F 12/0815* (2013.01); *G06F 12/0842* (2013.01); *G06F 12/0875* (2013.01); *G06F 2212/452* (2013.01); *G06F 2212/507* (2013.01); *G06F 2212/6042* (2013.01)

(58) Field of Classification Search
CPC ............. G06F 9/30043; G06F 12/0842; G06F 12/084; G06F 12/0815; G06F 12/0875; G06F 2212/6042; G06F 2212/507; G06F 2212/452
USPC ......................................................... 712/225
See application file for complete search history.

(56) References Cited

U.S. PATENT DOCUMENTS

| 5,819,079 | A | * | 10/1998 | Glew | G06F 9/3802 712/237 |
| 6,219,745 | B1 | * | 4/2001 | Strongin | G06F 12/0888 710/52 |
| 6,460,134 | B1 | | 10/2002 | Blomgren et al. | |
| 8,285,947 | B2 | | 10/2012 | Beaumont-Smith et al. | |
| 9,043,554 | B2 | | 5/2015 | Lilly et al. | |
| 9,383,995 | B2 | | 7/2016 | Kanapathipillai et al. | |
| 2005/0172081 | A1 | * | 8/2005 | Ogawa | G06F 12/0888 711/138 |
| 2009/0287885 | A1 | * | 11/2009 | Kriegel | G06F 9/3824 711/143 |
| 2014/0089589 | A1 | * | 3/2014 | Meier | G06F 9/30087 711/125 |
| 2014/0215191 | A1 | * | 7/2014 | Kanapathipillai | G06F 9/30043 712/220 |

* cited by examiner

*Primary Examiner* — Aimee Li
*Assistant Examiner* — Shawn Doman
(74) *Attorney, Agent, or Firm* — Kowert Hood Munyon Rankin and Goetzel PC; Rory D. Rankin

(57) ABSTRACT

Systems, apparatuses, and methods for processing load instructions are disclosed. A processor includes at least a data cache and a load queue for storing load instructions. The load queue includes poison indicators for load instructions waiting to reach non-speculative status. When a non-cacheable load instruction is speculatively executed, then the poison bit is automatically set for the load instruction. If a cacheable load instruction is speculatively executed, then the processor waits until detecting a first condition before setting the poison bit for the load instruction. The first condition may be detecting a cache line with data for the load instruction being evicted from the cache. If an ordering event occurs for a load instruction with a set poison bit, then the load instruction may be flushed and replayed. An ordering event may be a data barrier or a hazard on an older load targeting the same address as the load.

14 Claims, 8 Drawing Sheets

HANDLING NON-CACHEABLE LOADS IN A NON-COHERENT PROCESSOR

BACKGROUND

Technical Field

Embodiments described herein relate to the field of processors and more particularly, to processing load instructions.

Description of the Related Art

Integrated circuits (ICs) often include multiple circuits or agents that have a need to communicate with each other and/or access data stored in memory. In many cases, agents may communicate through various addresses defined in a common memory map or address space. In a typical IC, the address space of the IC may be split up into multiple different regions, including a cacheable region and an uncacheable region. Requests with addresses that fall within the cacheable region are eligible to be cached within the IC, while requests with addresses that fall within the uncacheable region are not expected to be cached within the IC.

A processor of the IC may use out-of-order execution (OoOE) to achieve higher levels of instruction throughput. Under this paradigm, instructions may be executed in a different order than program order (i.e., the order in which instructions are arranged within a program). In many instances, instructions may also be executed in parallel. A processor supporting OoOE, however, still needs to ensure that the output of any instructions executed out of order is the same as if those instructions had been executed in order.

A processor of the IC may be configured to execute various types of memory operations that target both the cacheable and uncacheable regions. The processor may include a memory system with multiple levels of caches for providing low latency access to instructions and data, and memory requests that reference the cacheable regions of the address space may typically be stored at any level of cache without restrictions. However, it is often difficult for processors to maintain coherency throughout the memory system for memory requests that reference the uncacheable regions of the address space.

In multiprocessor ICs, and even in single processor ICs in which other devices access main memory but do not access a given cache, the issue of cache coherence arises. That is, a given data producer can write a copy of data in the cache, and the update to main memory's copy is delayed. In write-through caches, a write operation is dispatched to memory in response to the write to the cache line, but the write is delayed in time. In a writeback cache, writes are made in the cache and not reflected in memory until the updated cache block is replaced in the cache (and is written back to main memory in response to the replacement).

Because the updates have not been made to main memory at the time the updates are made in cache, a given data consumer can read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Maintaining cache coherency is increasingly challenging as various different types of memory requests referencing uncacheable and cacheable regions of the address space are processed by the processor(s).

Additionally, in some ICs, some agents may not be included as part of the coherence and consistency domain, but rather the agents may be included in a non-coherent domain. These agents may be referred to as "non-coherent agents". For example, a processor in a non-coherent domain of the IC may be referred to as a "non-coherent processor". When a processor or processor core needs to access a memory region in a non-coherent domain in the SoC, overall coherency may still need to be maintained. In such cases, the burden of maintaining coherency may be placed on software being executed on the SoC. This may result in additional software complexity and reduced system performance.

Processors are often configured to execute load and store instructions out-of-order, and also permit loads to access memory in a speculative manner. Speculatively-executed loads and stores are typically held in queues until necessary criteria is met to make the loads and stores architecturally visible (i.e., visible to software). In a multi-processor environment, the order rules of memory accesses by various processors is defined by the memory consistency model specified by a given instruction set architecture (ISA). The weakly-ordered model is one such memory consistency model.

SUMMARY

Systems, apparatuses, and methods for processing load instructions are contemplated.

In various embodiments, a system may include a plurality of processors coupled to a shared system memory. At least one of the processors may be a non-coherent processor. In one embodiment, the non-coherent processor may be configured to execute instructions out-of-order, and the non-coherent processor may utilize a weakly ordered memory consistency model. The non-coherent processor may include at least a data cache and a load queue. The load queue may maintain status information for load instructions stored in the load queue. In one embodiment, the status information may include an indicator (or flag) for each entry in the load queue. The indicators may be usable to conditionally flush and replay corresponding load instructions.

In one embodiment, the processor may speculatively execute load instructions and forward data from the load instructions to the load queue. If a speculatively executed load instruction is a non-cacheable load, then the processor may automatically set an indicator for the first load instruction. If a speculatively executed load instruction is a cacheable load, then the processor may wait until detecting a first condition before setting the indicator for the first load instruction. In one embodiment, the first condition is detecting a cache line with data of the load instruction being evicted from the cache prior to the load instruction completing. In another embodiment, the first condition is receiving a snoop request targeting a cache line with data of the load instruction prior to the load instruction completing. In a further embodiment, the first condition is a cache line with data of the load instruction becoming invalidated.

If an ordering violation occurs and the indicator is set for a load instruction, then the load instruction may be flushed and replayed. In one embodiment, the ordering violation may be caused by the detection of a data barrier older than the load instruction. In another embodiment, the ordering violation may be caused by an older load instruction to the same address receiving source data after the younger load instruction.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
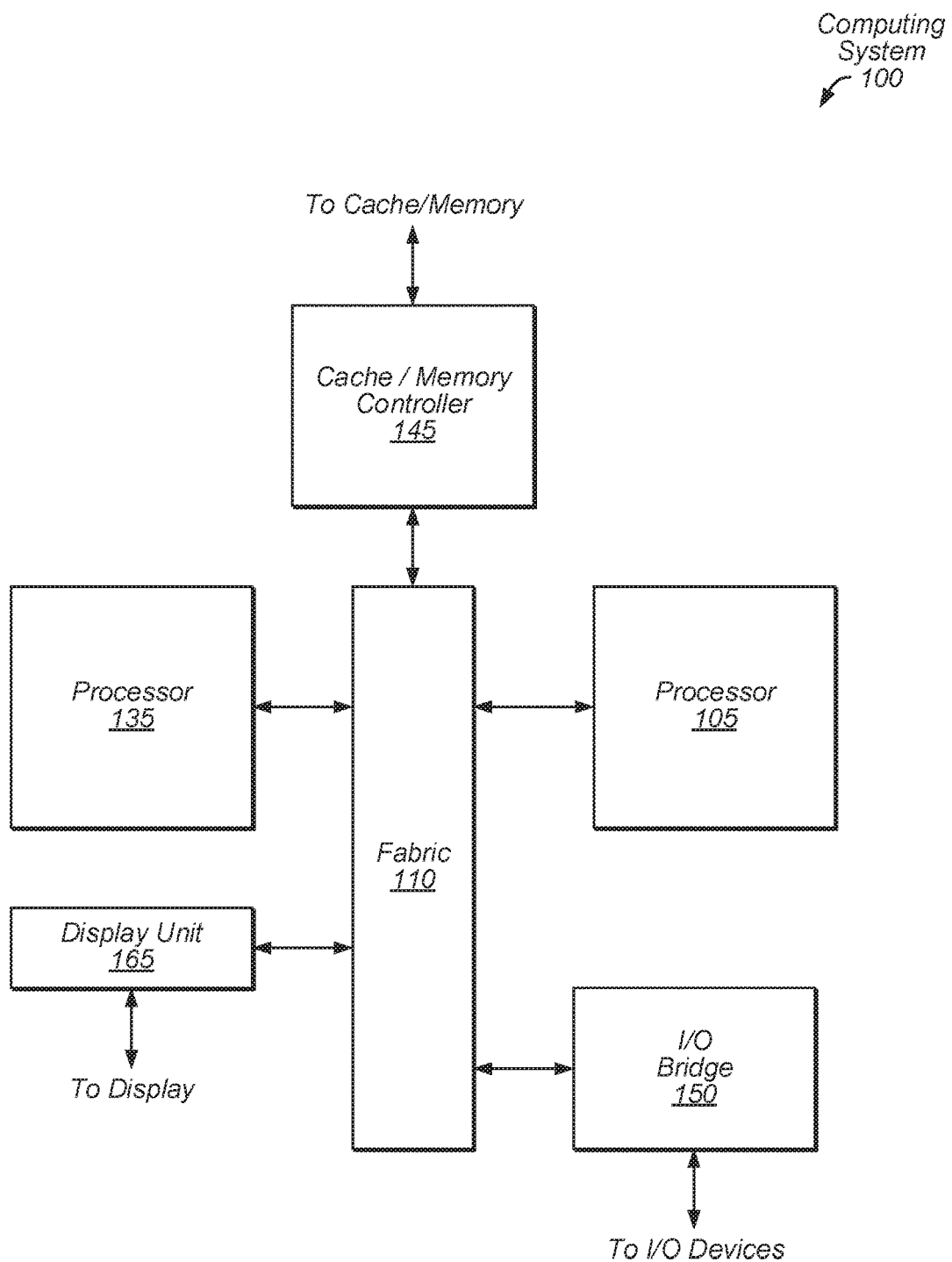
FIG. 1 is a block diagram illustrating one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . ." Such a claim does not foreclose the system from including additional components (e.g., a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

It is noted that throughout this disclosure, memory requests that reference the uncacheable region of the address space may be referred to as "uncacheable memory requests". Memory requests may also be referred to as "transactions", "memory access operations", or "memory operations", which are a type of instruction operation. In various embodiments, memory operations may be implicitly specified by an instruction having a memory operation, or may be derived from explicit load/store instructions. Furthermore, a "load instruction" or "load operation" may refer to a transfer of data from memory or cache to a processor, and a "store instruction" or "store operation" may refer to a transfer of data from a processor to memory or cache. "Load operations" and "store operations" may be more succinctly referred to herein as "loads" and "stores", respectively.

Furthermore, a load may be referred to as a "cacheable load" if the load addresses a cacheable region of the address space or a "non-cacheable load" if the load addresses an uncacheable region of the address space. Similarly, a store may be referred to as a "cacheable store" if the store addresses a cacheable region of the address space or a "non-cacheable store" if the store addresses an uncacheable region of the address space.

Referring now to FIG. 1, a block diagram illustrating one embodiment of a computing system 100. In some embodiments, some or all elements of the computing system 100 may be included within an integrated circuit (IC) or a system on a chip (SoC). In some embodiments, computing system 100 may be included in a mobile device. In the illustrated embodiment, the computing system 100 includes fabric 110, processors 105 and 135, input/output (I/O) bridge 150, cache/memory controller 145, and display unit 165.

Fabric 110 may include various interconnects, buses, MUXes, controllers, etc., and may be configured to facilitate communication between various elements of computing system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally.

Depending on the embodiment, each of processors 105 and 135 may include various numbers of cores and/or caches. For example, processors 105 and 135 may include 1, 2, or 4 processor cores, or any other suitable number. In some embodiments, processors 105 and 135 may include internal instruction and/or data caches. In some embodiments, a coherency unit (not shown) in fabric 110 or elsewhere in computing system 100 may be configured to maintain coherency between various caches of computing system 100. Processors may be configured to execute instructions of a particular instruction set architecture (ISA), which may include operating system instructions and user application instructions.

Processors 105 and 135 are coupled to fabric 110, and processors 105 and 135 may access system memory via cache/memory controller 145. In one embodiment, processor 135 may be a non-coherent agent of system 100. Processor 135 may execute instructions out of order and utilize a weakly ordered memory model. In one embodiment, when processor 135 executes a non-cacheable load instruction and forwards data speculatively for the load to the load queue, processor 135 may set a status flag in the load queue for the load. The status flag may be usable to conditionally cause a flush and replay of the load if an ordering event occurs before the load is completed. An ordering event may be a data barrier older than the load or a hazard on an older load targeting the same address as the load.

Cache/memory controller 145 may be configured to manage transfer of data between fabric 110 and one or more caches and/or memories (e.g., non-transitory computer readable mediums). For example, cache/memory controller 145 may be coupled to an L3 cache, which may, in turn, be coupled to a system memory. In other embodiments, cache/memory controller 145 may be directly coupled to a memory. In some embodiments, the cache/memory controller 145 may include one or more internal caches.

Display unit 165 may be configured to read data from a frame buffer and provide a stream of pixel values for display. Display unit 165 may be configured as a display pipeline in some embodiments. Furthermore, display unit 165 may include one or more interfaces (e.g., MIPI® or embedded display port (eDP)) for coupling to a user display (e.g., a touchscreen or an external display). I/O bridge 150 may include various elements configured to implement universal serial bus (USB) communications, security, audio, low-power always-on functionality, and/or other functions. I/O bridge 150 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 100 via I/O bridge 150. In some embodiments, central processing unit 105 may be coupled to computing system 100 via I/O bridge 150.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
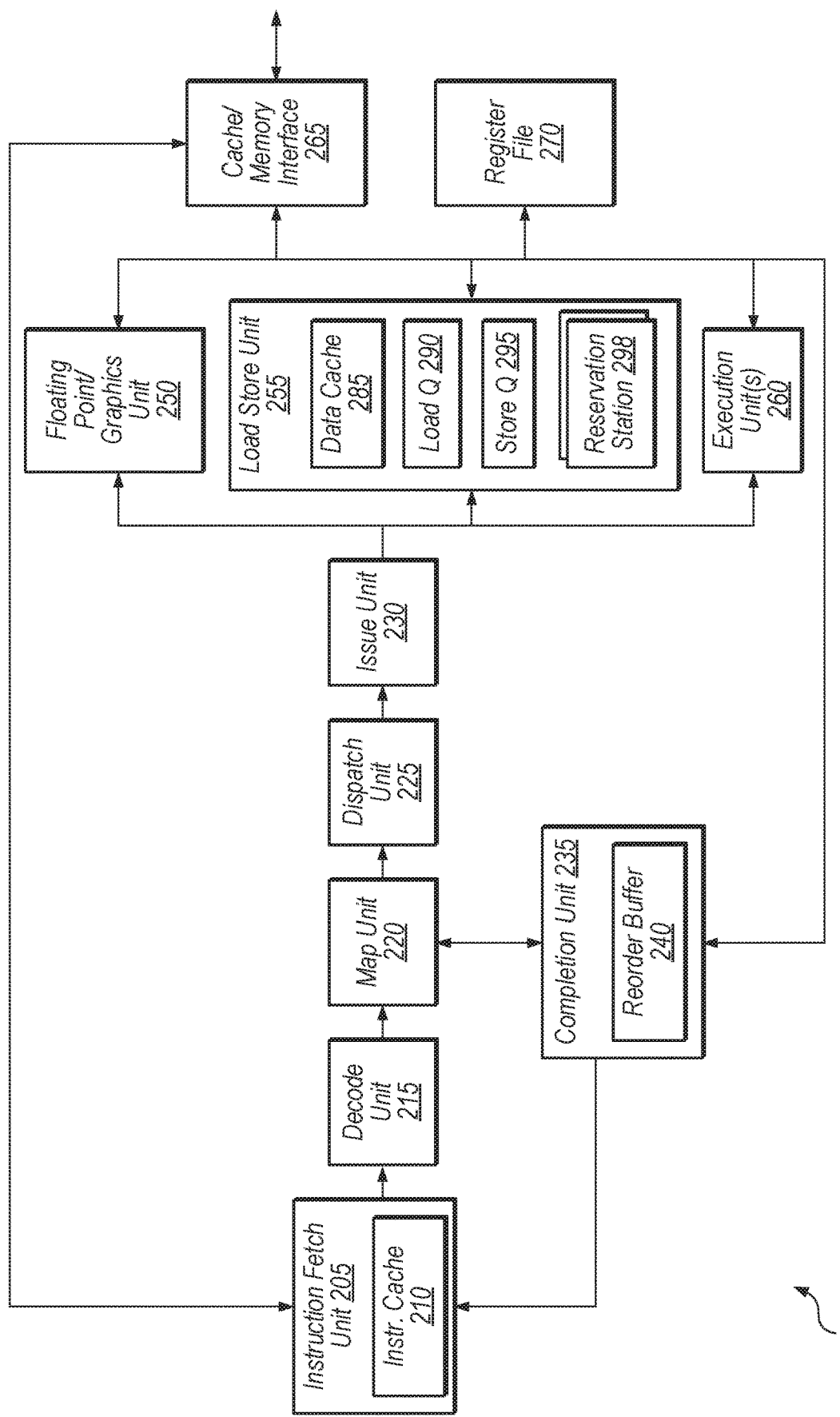
FIG. 2 is a block diagram of one embodiment of a processor.

Turning now to FIG. 2, a block diagram of one embodiment of a processor 200 is shown. In various embodiments, portions or the entirety of the logic of processor 200 may be included within processor 135 (of FIG. 1) and/or processor 105. Processor 200 includes instruction fetch unit (IFU) 205 which includes an instruction cache 210. IFU 205 is coupled to various processing components that embody an instruction processing pipeline that begins with a decode unit 215 and proceeds in turn through map unit 220, dispatch unit 225, and issue unit 230. The issue unit 230 is coupled to instruction execution resources including the execution unit(s) 260, the load/store unit (LSU) 255, and the floating-point/graphics unit (FGU) 250. These instruction execution resources are also coupled to the register file 270. Additionally, LSU 255 is coupled to cache/memory interface 265. Completion unit 235 is coupled to IFU 205, map unit 220, register file 270, and the outputs of any number of the instruction execution resources. It is noted that the components shown in FIG. 2 are only one implementation of a processor. It is contemplated that in other embodiments, some components may be omitted and other components may be added. Thus, alternative configurations and variations are possible and contemplated.

The IFU 205 may be configured to provide instructions to the rest of the pipeline components for execution. In one embodiment, the IFU 205 may be configured to fetch instructions from an instruction cache 210 and to buffer those instructions for downstream processing, request data from a cache or memory through the cache/memory interface 265 in response to instruction cache misses, and predict the direction and target of control transfer instructions (e.g., branches).

It is noted that the concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load/store unit). The latter meaning may also be referred to as "performing" the instruction. Thus, "performing" a store instruction refers to retrieving the value of the store's target location, which may, in some embodiments, be accomplished by a circuit at an execute stage of a pipeline (e.g., by a load/store unit). Conversely, "executing" the store instruction may refer to the entirety of operations that occur throughout the pipeline as a result of the store instruction. Instructions may be speculatively executed, and may be flushed and replayed or retried if one or more conditions are not as speculated. In addition, the speculatively executed instructions may be held while waiting for the conditions to be fulfilled. Various approaches to flushing and replaying instructions are known in the art. Generally speaking, as used herein the terms "flush" or "flushing" refer to removing one or more instructions from execution in a processor pipeline. If the removed instructions are to be subsequently executed, they will typically need to be refetched. On the other hand, as used herein the terms "replay", "retry", "retrying" or "replaying" refer to re-executing an instruction without the instruction being refetched. For example, replay of an instruction may entail redirecting the instruction to an earlier stage of a pipeline. Flushing and replaying may both involve undoing ("rewinding") changes that have been made to a state of the processor in order to return to an earlier state. As such, rewinding may refer to undoing operations performed during execution of one or more instructions. For example, rewinding may include un-mapping physical registers and destination registers, marking results as invalid, removing entries from various buffers, and so on.

Further, as used herein, the term "target" in the context of load and store instructions refers to the location from which a load instruction should read or the location to which a store instruction should write. A target may be identified by a virtual address and/or a physical address. In some situations, instructions with the same target may not actually access the same storage element. For example, an older store may write information to a target location in a memory (or a cache) while a load reads from the target by forwarding the data from the store without accessing a cache or memory. In this example situation the load and the store both target the same target location (e.g., using the same memory address), but do not use the same storage element to access the target location. Further, an instruction may "target" a cache line when it targets a location in the cache line. Also, snoops typically target a cache on a cache-line basis.

In one embodiment, the decode unit 215 may be configured to prepare fetched instructions for further processing. The decode unit 215 may be configured to identify the particular nature of an instruction (e.g., as specified by its opcode) and to determine the source and destination registers encoded in an instruction, if any. In some embodiments, the decode unit 215 may be configured to detect certain dependencies among instructions and/or to convert certain complex instructions to two or more simpler instructions for execution.

As used herein, the term "instruction" refers to information indicative of one or more operations to be performed by a processor pipeline. An "operation" may include a processing element doing nothing during a given processing cycle, e.g., based on a "nop" or "no-operation" instruction or a conditional instruction for which the condition is false. An instruction may be defined by a given instruction set architecture (ISA). An instruction may also be defined by a microarchitecture rather than tied to a particular ISA. For example, the decode unit 215 may be configured to decode an ISA instruction into one or more micro-operations, which may also be referred to as "instructions" when they specify an operation to be performed by a processor pipeline. Thus, a "store instruction" may or may not be defined by an ISA. A store instruction includes information indicative that a store operation is to be performed and typically includes information indicating a store's target memory location.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Register renaming may facilitate the elimination of certain dependencies between instructions (e.g., write-after-read or "false" dependencies), which may in turn prevent unnecessary serialization of instruction execution. In one embodiment, map unit 220 may be configured to rename the architectural destination registers specified by instructions of a particular ISA by mapping them to a physical register space, resolving false dependencies in the process.

Once decoded and renamed, instructions may be ready to be scheduled for performance. In the illustrated embodiment, the dispatch unit 225 may be configured to schedule (i.e., dispatch) instructions that are ready for performance and to send the instructions to issue unit 230. In one embodiment, the dispatch unit 225 may be configured to maintain a schedule queue that stores a number of decoded and renamed instructions as well as information about the relative age and status of the stored instructions. For example, taking instruction dependency and age information into account, dispatch unit 225 may be configured to pick one or more instructions to send to issue unit 230.

The issue unit 230 may be configured to provide instruction sources and data to the various execution units for picked (i.e., scheduled or dispatched) instructions. In one embodiment, the issue unit 230 may include reservation stations for storing instructions while waiting for their operands and/or for other processing resources to become available. In other embodiments, the issue unit 230 may provide instructions to reservation stations (e.g., reservation stations 298) distributed among FGU 250, LSU 255, execution unit(s) 260, etc. Results may also be sourced from register files representing architectural (i.e., user-visible) as well as non-architectural state. In the illustrated embodiment, processor 200 includes a register file 270 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units to be performed. In one embodiment, each of execution unit(s) 260 may be similarly or identically configured to perform certain integer-type instructions defined in the implemented ISA, such as arithmetic, logical, and shift instructions. In some embodiments, architectural and non-architectural register files are physically implemented within or near execution unit(s) 260. It is contemplated that in some embodiments, processor 200 may include any number of integer execution units.

The LSU 255 may be configured to receive instruction information from the instruction processing pipeline (of which LSU 255 may be considered a part) and LSU 255 may be coupled to a higher-level cache (relative to data cache 285) and/or a memory. Further, LSU 255 may be configured to process data memory references, such as integer and floating-point load and store instructions and other types of memory reference instructions. In the illustrated embodiment, the LSU 255 includes data cache 285, load queue 290, store queue 295, and reservation stations 298. The LSU 255 may be configured to detect misses in the data cache 285 (which may be a level 1 data cache for example) and to responsively request data from a cache or memory through cache/memory interface 265.

In some embodiments, load queue 290 and store queue 295 are configured to queue load and store instructions, respectively, until their results can be committed to the architectural state of the processor. Instructions in the queues may be speculatively performed, non-speculatively performed, or waiting to be performed. Each queue may include a plurality of entries, which may store loads/stores in program order. However, load and store instructions may be executed out of program order earlier in the processing pipeline. As used herein, the term "queue" refers to a storage element having a plurality of entries. Queues are often used to store data (e.g., data associated with instructions) while waiting for processing resources to become available or for particular events to occur. In some embodiments, queues are used to store instruction information in program order even though the instructions may be performed out of program order. Thus, queues do not always behave in a first-in-first-out (FIFO) manner. For example, if instruction information arrives out of program order but is removed in program order, the information may not be dequeued (or retired) in the same order in which it is enqueued. As used herein, the term "storage element" refers to any element configured to store one or more values in a volatile or non-volatile manner. Examples of storage elements include: registers, memories, latches, disks, etc.

In one embodiment, load queue 290 may be configured to store information associated with load instructions. More particularly, each entry in load queue 290 may include address information corresponding to the target location of a load, data associated with the load, and status information. The status information may include a flag to indicate if data for the load has been speculatively forwarded to load queue 290. This flag may also be referred to as a "poison bit" or "poison indicator". Determining when to set the poison bit may vary depending on whether the load is a non-cacheable load or a cacheable load. The poison bit may be automatically set for a non-cacheable load when data for the load has been speculatively forwarded to load queue 290. The poison bit may be set for a cacheable load when a cache line with data for the load is invalidated.

The status information may also include an indicator for each load to indicate whether or not a store operation to the same target address has been received. Similarly, store queue 295 may be configured to store information associated with store instructions. More particularly, each entry in store queue 295 may include address information corresponding to the target location of a store, data associated with the store, and status information. In other embodiments, the load and store queues may be combined into a single load/store queue.

In one embodiment, the LSU 255 may attempt to speculatively perform loads as soon as they arrive. However, the LSU 255 may retry speculatively-executed loads based on older conflicting stores, cache line migrations, or other events. For example, if the poison bit is set for a load and an ordering violation occurs for the load, then the load may be flushed and replayed. In various embodiments, an ordering violation may be the detection of a data barrier older than the load or an older load (to the same address as a younger load) receiving source data subsequent to the younger load. In other embodiments, other ordering violations may cause a load with a poison bit set to be flushed and replayed.

In various embodiments, LSU 255 may implement a variety of structures configured to facilitate memory operations. For example, LSU 255 may implement a data translation lookaside buffer (TLB) to cache virtual data address translations. LSU 255 may also include hardware configured to support atomic load-store instructions, memory-related exception detection, read and write access to special-purpose registers (e.g., control registers), and detect memory ordering violations responsive to snoop operations, for example.

Floating-point/graphics unit (FGU) 250 may be configured to perform and provide results for certain floating-point and graphics-oriented instructions defined in the implemented ISA. For example, in one embodiment FGU 250 implements single- and double-precision floating-point arithmetic instructions compliant with the IEEE floating-point standards, such as add, subtract, multiply, divide, and certain transcendental functions.

In the illustrated embodiment, completion unit 235 includes a reorder buffer (ROB) 240. The completion unit may be configured to coordinate transfer of speculative results into the architectural state of processor 200. Entries in ROB 240 may be allocated in program order. The completion unit 235 may include other elements for handling completion/retirement of instructions and/or storing history including register values, etc. As used herein, the terms "complete" and "completion" in the context of an instruction refer to commitment of the instruction's result(s) to the architectural state of a processor or processing element. For example, in one embodiment, completion of an add instruction includes writing the result of the add instruction to a destination register. Similarly, completion of a load instruction includes writing a value (e.g., a value retrieved from a cache or memory) to a destination register or a representation thereof.

In some embodiments, speculative results of instructions may be stored in ROB 240 before being committed to the architectural state of processor 200, and confirmed results may be committed in program order. Entries in ROB 240 may be marked as ready to complete (or "retire") when their results are allowed to be written to the architectural state. The completion unit 235 may also be configured to coordinate instruction flushing and/or replaying of instructions. In order to detect conflicts, each entry in load queue 290 and store queue 295 may include an address of its target location. At least a portion of the address field may be implemented using content addressable memory (CAM). Thus, LSU 255 may provide a load's target address to the CAM fields of older stores in store queue 295 to determine whether any older stores to the same location reside in store queue 295. In some situations, a younger load may arrive at load queue 290 when older stores have not yet arrived at store queue 295. In this situation, in some embodiments, LSU 255 may speculatively execute the younger load but may not allow it to retire until all older stores have reached store queue 295 so that the younger load can be checked for dependencies.

Memory ordering is a common memory system requirement. For example, loads to the same memory address must be ordered with respect to each other, such that a younger load instruction never reads an "older" value of data from a given memory address when an older load to the same address reads a "newer" value. Likewise load-store operations must be ordered to enforce read after write rules to prevent a younger read to a target address from speculatively executing before an older write to the target address has occurred.

As used herein, the terms "older" and "younger" refer to relative ages of instructions in an instruction stream. Said another way, older instructions precede younger instructions in program order. Further, "older" data refers to data associated with a relatively older instruction while "newer" data refers to data associated with a relatively younger instruction. For example, an older store may be described as having written old data to a particular location when a younger store writes new data to the particular location.

Figure 3:
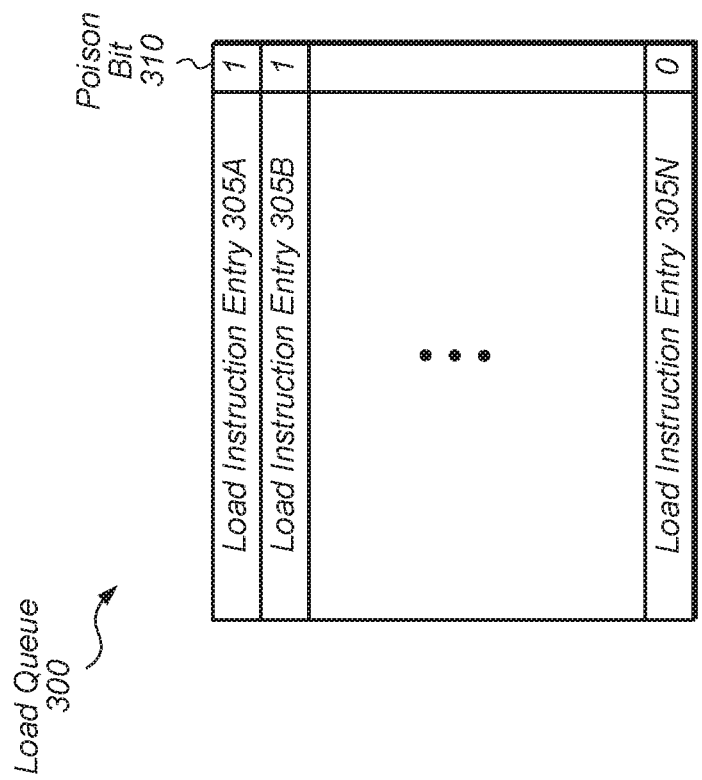
FIG. 3 is a block diagram of one embodiment of a load queue.

Referring now to FIG. 3, a block diagram of one embodiment of a load queue 300 is shown. Load queue 300 may be configured to queue load instructions until their results can be committed to the architectural state of the processor. Load instructions in load queue 300 may be speculatively performed, non-speculatively performed, or waiting to be performed. In one embodiment, each entry 305A-N in load queue 300 may include address information corresponding to the target location of a load, data associated with the load, and status information.

Entries 305A-N are representative of any number of entries within load queue 300 for storing load instructions, depending on the embodiment. Each of entries 305A-N may also include status information of the corresponding load instruction. In one embodiment, the status information may include at least a poison bit 310 to indicate if the load should be flushed and replayed if an ordering event is detected. Determining when to set the poison bit 310 may vary depending on whether the load is a non-cacheable load or a cacheable load. The poison bit 310 may be automatically set for a non-cacheable load when data for the load has been speculatively forwarded to load queue 300. The poison bit 310 may be set for a cacheable load when a cache line with data for the load is invalidated. If the poison bit 310 is set for a given load instruction entry and an ordering violation is detected, then the given load instruction may be flushed and replayed.

For example, if the poison bit 310 is set for a first load and an ordering violation is detected, then the first load may be flushed and replayed. In various embodiments, an ordering violation may be the detection of a data barrier older than the first load or an older load receiving source data subsequent to the first load and the older load targeting the same address as the first load. In other embodiments, other ordering violations may cause a load with its poison bit set to be flushed and replayed.

Figure 4:
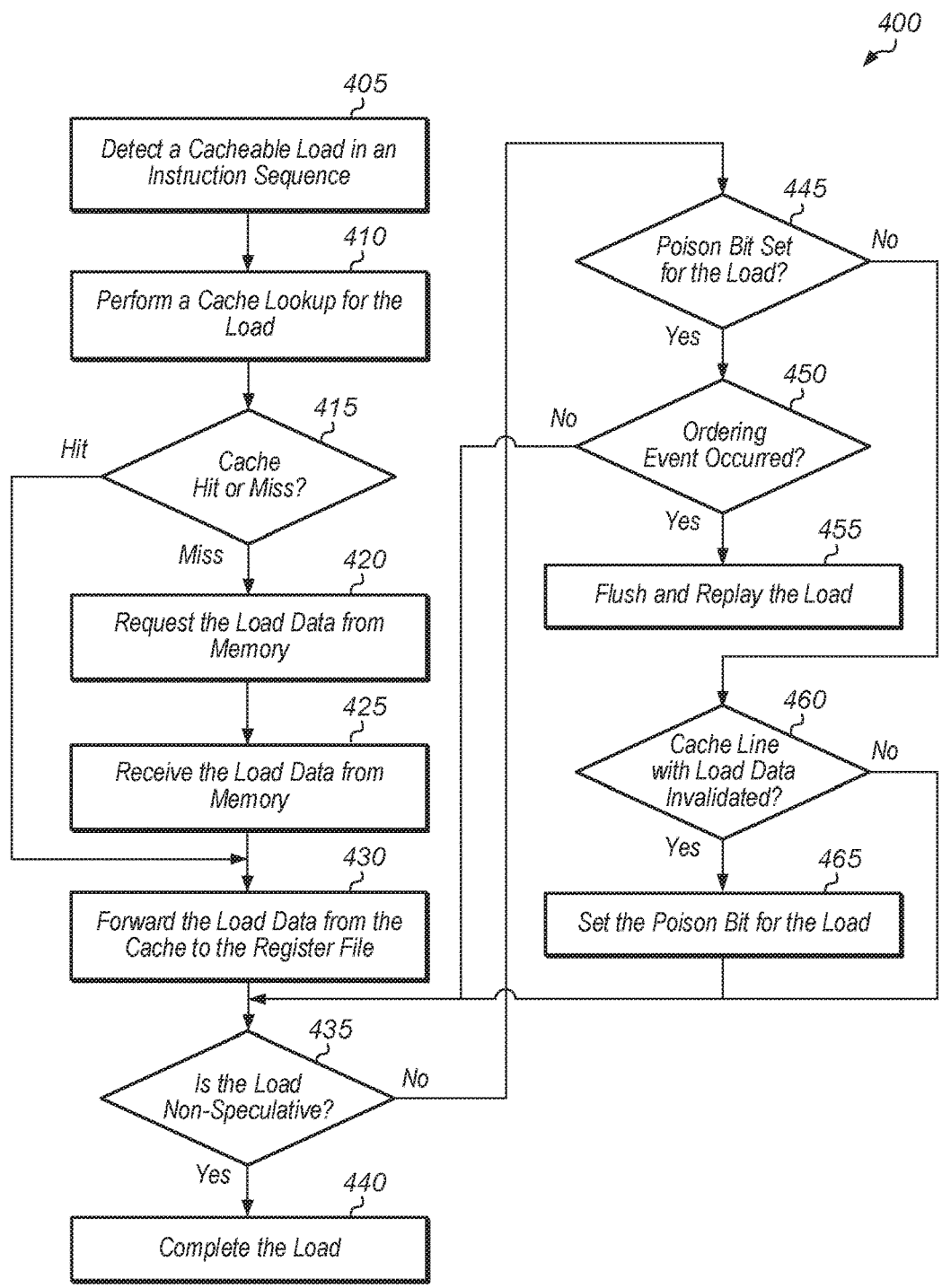
FIG. 4 is a generalized flow diagram illustrating one embodiment of a method for speculatively executing cacheable load instructions.

Turning now to FIG. 4, one embodiment of a method 400 for speculatively executing cacheable load instructions is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 400.

A processor detects a cacheable load in an instruction sequence (block 405). In one embodiment, the processor executes instructions out-of-order and the processor utilizes a weakly ordered memory model. In one embodiment, the processor is part of a system (e.g., SoC) with one or more other processors. In response to detecting the cacheable load, the processor performs a cache lookup for the load (block 410).

If the load misses in the cache (conditional block 415, "miss" leg), then the processor requests the load data from memory or another cache (block 420). After the load data is received (block 425), the processor forwards the load data from the cache to the register file (block 430). If the load hits in the cache (conditional block 415, "hit" leg), then the processor forwards the load data from the cache to the register file (block 430).

Then, the processor determines if the load has reached non-speculative status (conditional block 435). In one embodiment, the load waits in a speculative state if there are any older unresolved instructions waiting to be completed. Once all older unresolved instructions, then the load becomes non-speculative. If the load is non-speculative (conditional block 435, "yes" leg), then the processor completes the load (block 440). If the load is still speculative (conditional block 435, "no" leg), then the processor determines if the poison bit is set for the load (conditional block 445). If the poison bit is set for the load (conditional block 445, "yes" leg), then the processor determines if an ordering event has occurred for the load (conditional block 450). Depending on the embodiment, an ordering event may be caused by a data barrier older than the load, a load-to-load violation such as an older load targeting the same address receiving its data after the load, or another event. If the poison bit is not set for the load (conditional block 445, "no" leg), then the processor may determine if the cache line with load data has been invalidated (conditional block 460). In one embodiment, the cache line is invalidated if there is a snoop request to the cache line or if the cache line is evicted from the cache.

If an ordering event has occurred for the load (conditional block 450, "yes" leg), then the processor flushes and replays the load (block 455). Also, any instructions younger than the load which were speculatively executed may also be flushed and replayed. If an ordering event has not occurred for the load (conditional block 450, "no" leg), then the processor determines if the load has reached non-speculative status (conditional block 435). If the cache line with load data has been invalidated (conditional block 460, "yes" leg), then the poison bit is set for the load (block 465). After block 465, method 400 returns to conditional block 435. If the cache line with load data has not been invalidated (conditional block 460, "no" leg), then method 400 returns to conditional block 435 without setting the poison bit.

Figure 5:
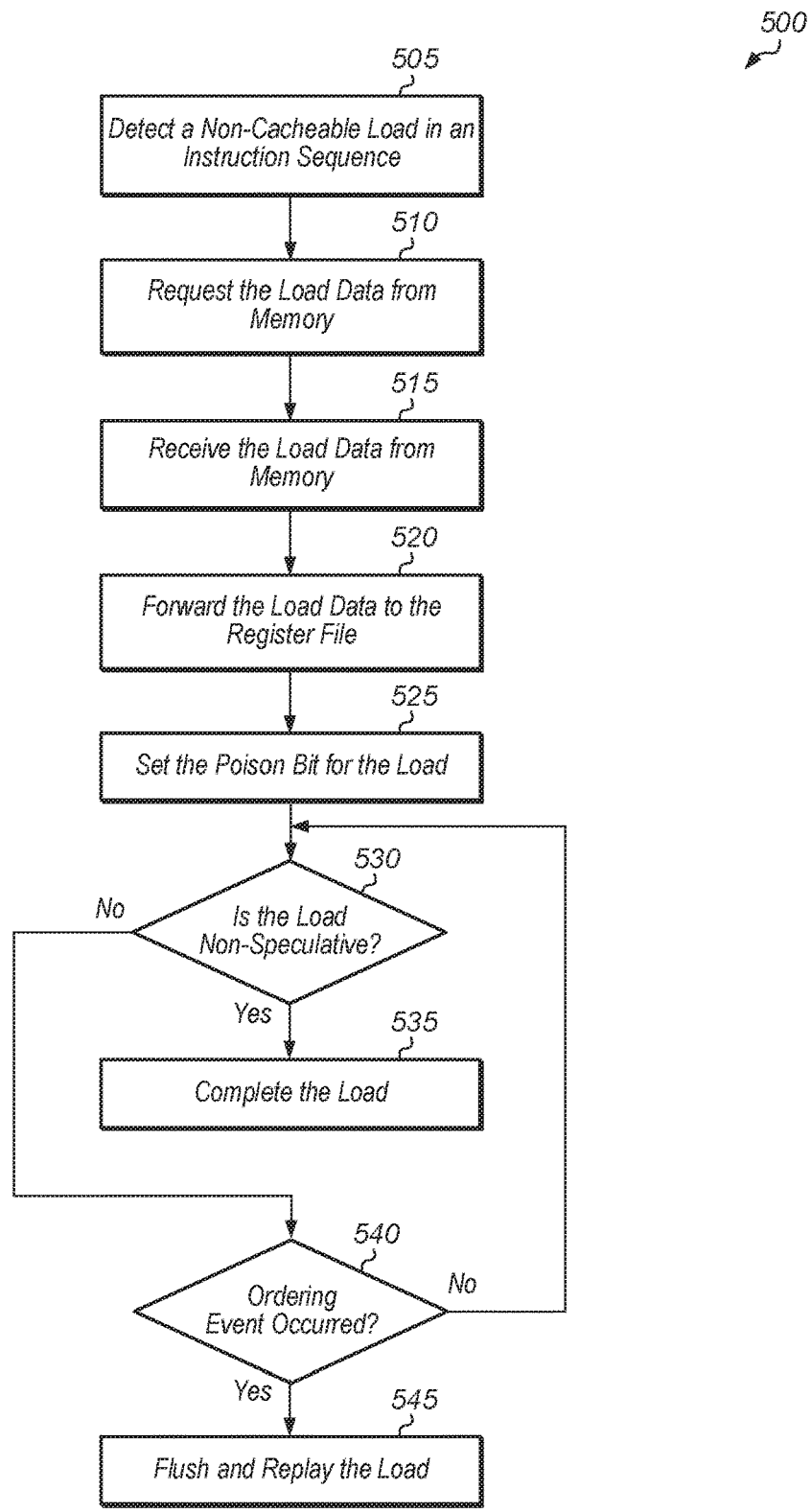
FIG. 5 is a generalized flow diagram illustrating one embodiment of a method for speculatively executing non-cacheable load instructions.

Referring now to FIG. 5, one embodiment of a method 500 for speculatively executing non-cacheable load instructions is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 500.

A processor detects a non-cacheable load in an instruction sequence (block 505). In one embodiment, the processor executes instructions out-of-order and the processor utilizes a weakly ordered memory model. In one embodiment, the processor is part of a system (e.g., SoC) with one or more other processors. In response to detecting the cacheable load, the processor requests the load data from memory (block 510). After the load data is received from memory (block 515), the processor forwards the load data to the register file (block 520). Next, the processor sets the poison bit for the load (block 525).

Then, the processor determines if the load has reached non-speculative status (conditional block 530). If the load is non-speculative (conditional block 530, "yes" leg), then the processor completes the load (block 535). After block 535, method 500 may end. If the load is still speculative (conditional block 530, "yes" leg), then the processor determines if an ordering event has occurred for the load (conditional block 540). Depending on the embodiment, an ordering event may be caused by a data barrier older than the load, a load-to-load violation such as an older load targeting the same address receiving its data after the load, or other condition. If an ordering event has occurred for the load (conditional block 540, "yes" leg), then the processor flushes and replays the load (block 545). After block 545, method 500 may end. If an ordering event has not occurred for the load (conditional block 540, "no" leg), then the processor determines if the load has reached non-speculative status (conditional block 530).

Figure 6:
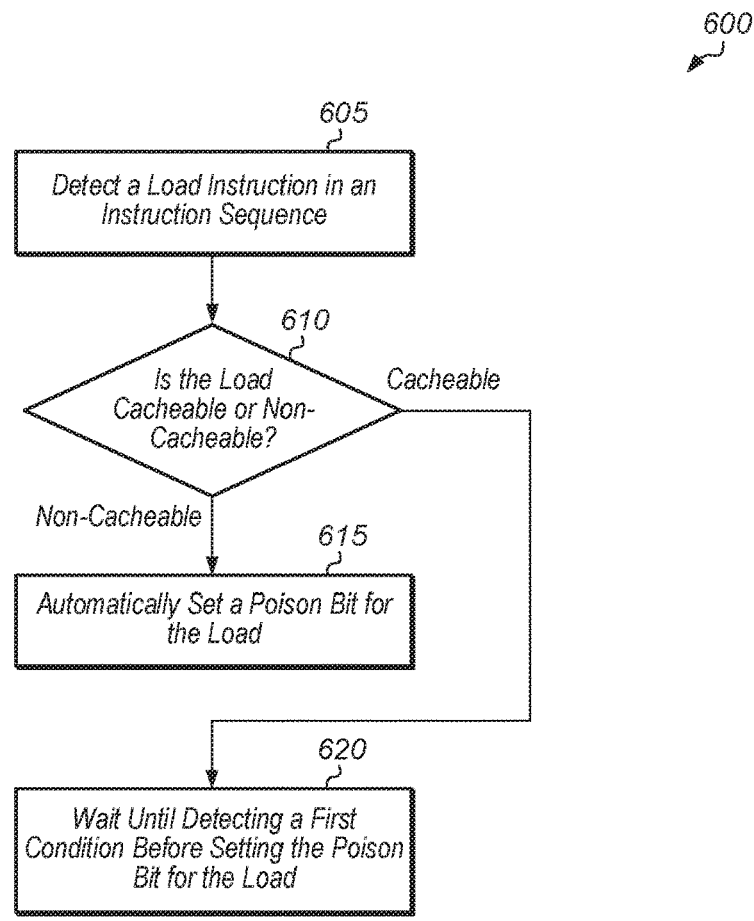
FIG. 6 is a generalized flow diagram illustrating one embodiment of a method for determining when to set the poison bit for a load.

Turning now to FIG. 6, one embodiment of a method 600 for determining when to set the poison bit for a load is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein or any of various other types of devices may be configured to implement method 600.

A processor detects a load instruction in an instruction sequence (block 605). In one embodiment, the processor executes instructions out-of-order and the processor utilizes a weakly ordered memory model. In one embodiment, the processor is part of a system (e.g., SoC) with one or more other processors. Next, the processor determines if the load is a non-cacheable load or a cacheable load (conditional block 610). In one embodiment, the processor determines if the load is non-cacheable or cacheable based on the address of the load. In another embodiment, the processor determines if the load is non-cacheable or cacheable based on an indicator associated with the load.

If the load is a non-cacheable load (conditional block 610, "non-cacheable leg"), then the processor automatically sets a poison bit for the load (block 615). If the load is a cacheable load (conditional block 610, "cacheable leg"), then the processor waits until detecting a first condition before setting the poison bit for the load (block 620). In one embodiment, the first condition is detecting a cache line with the load data being invalidated. After blocks 615 and 620, method 600 may end.

Figure 7:
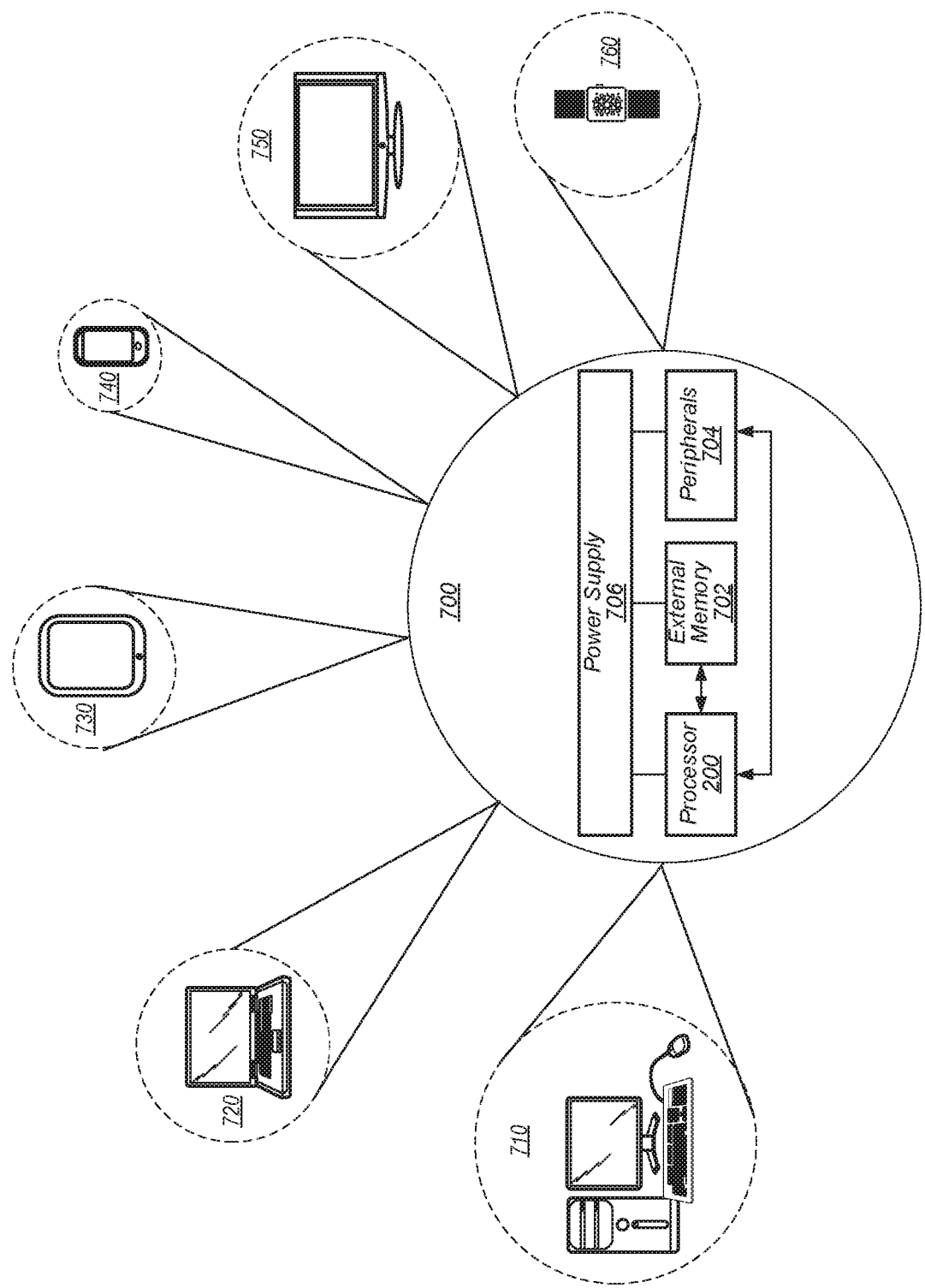
FIG. 7 is a block diagram of one embodiment of a system.

Referring next to FIG. 7, a block diagram of one embodiment of a system 700 is shown. As shown, system 700 may represent chip, circuitry, components, etc., of a desktop computer 710, laptop computer 720, tablet computer 730, cell or mobile phone 740, television 750 (or set top box configured to be coupled to a television), wrist watch or other wearable item 760, or otherwise. Other devices are possible and are contemplated. In the illustrated embodiment, the system 700 includes at least one instance of processor 200 (of FIG. 2) coupled to an external memory 702. In various embodiments, processor 200 may be included within a system on chip (SoC) or integrated circuit (IC) which is coupled to external memory 702, peripherals 704, and power supply 706.

Processor 200 is coupled to one or more peripherals 704 and the external memory 702. A power supply 706 is also provided which supplies the supply voltages to processor 200 as well as one or more supply voltages to the memory 702 and/or the peripherals 704. In various embodiments, power supply 706 may represent a battery (e.g., a rechargeable battery in a smart phone, laptop or tablet computer). In some embodiments, more than one instance of processor 200 may be included (and more than one external memory 702 may be included as well).

The memory 702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing processor 200 in a chip-on-chip configuration, a package-on-package configuration, or a multi-chip module configuration.

The peripherals 704 may include any desired circuitry, depending on the type of system 700. For example, in one embodiment, peripherals 704 may include devices for various types of wireless communication, such as wifi, Bluetooth, cellular, global positioning system, etc. The peripherals 704 may also include additional storage, including RAM storage, solid state storage, or disk storage. The peripherals 704 may include user interface devices such as a display screen, including touch display screens or multi-touch display screens, keyboard or other input devices, microphones, speakers, etc.

Figure 8:
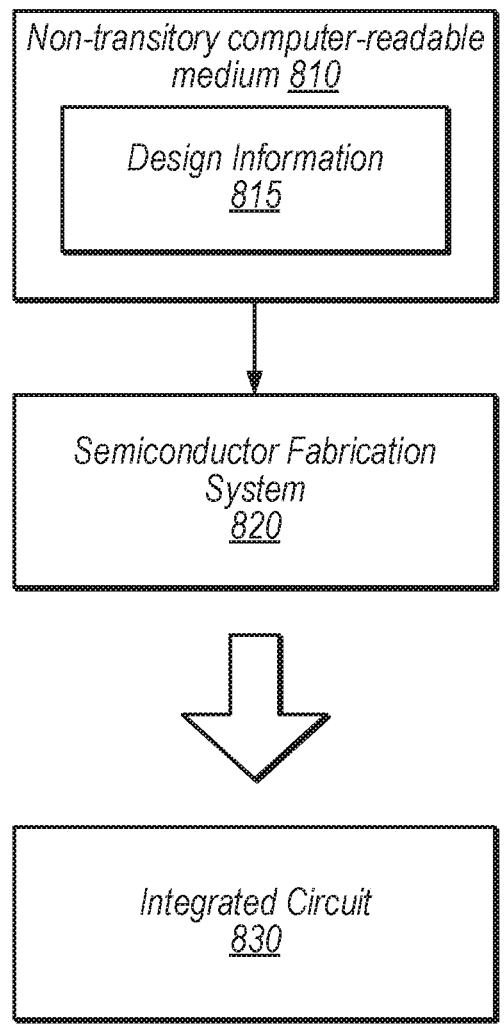
FIG. 8 is a block diagram illustrating an exemplary non-transitory computer-readable storage medium that stores circuit design information.

Turning now to FIG. 8, a block diagram illustrating an exemplary non-transitory computer-readable storage medium that stores circuit design information is shown. In the illustrated embodiment, semiconductor fabrication system 820 is configured to process the design information 815 stored on non-transitory computer-readable medium 810 and fabricate integrated circuit 830 based on the design information 815.

Non-transitory computer-readable medium 810 may comprise any of various appropriate types of memory devices or storage devices. Medium 810 may be an installation medium, (e.g., a CD-ROM, floppy disks, or tape device) a computer system memory or random access memory (e.g., DRAM, DDR RAM, SRAM, EDO RAM, Rambus RAM), a non-volatile memory (e.g., a Flash, magnetic media, a hard drive, optical storage), registers, or other similar types of memory elements. Medium 810 may include other types of non-transitory memory as well or combinations thereof. Medium 810 may include two or more memory mediums which may reside in different locations (e.g., in different computer systems that are connected over a network).

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis and/or layout of integrated circuit 830.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1-3. Furthermore, integrated circuit 830 may be configured to perform various functions described herein in conjunction with other components. For example, integrated circuit 830 may be coupled to voltage supply circuitry that is configured to provide a supply voltage (e.g., as opposed to including a voltage supply itself). Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
one or more execution units;
a cache having a plurality of cache lines;
a load queue configured to maintain status information for load instructions;
wherein the processor is configured to:
speculatively execute a first load instruction;
determine whether the first load instruction is non-cacheable or cacheable based on an address space targeted by the first load instruction;
wait until detection that requested data targeted by the first load instruction is retrieved from lower-level memory and forwarded to one or more of the load queue and a register file before a flush and replay indicator is set in the status information of the load queue for the first load instruction, responsive to a determination that the first load instruction is a non-cacheable load instruction; and
wait until detection of a first condition before the flush and replay indicator is set in the status information of the load queue for the first load instruction, responsive to a determination that the first load instruction is a cacheable load instruction; and
wherein the processor is configured to flush and replay the first load instruction responsive to detection that the flush and replay indicator is set and an ordering violation has occurred.

2. The processor as recited in claim 1, wherein the first condition is one of:
detection of a cache line with data of the first load instruction being evicted from the cache, prior to completion of the first load instruction; and
receipt of a snoop request that targets a cache line with data of the first load instruction, prior to completion of the first load instruction.

3. The processor as recited in claim 1, wherein responsive to a determination that the first load instruction is a cacheable load instruction, the processor is configured to wait until detection that requested data targeted by the first load instruction is invalidated in the cache before the flush and replay indicator is in the status information of the load queue for the first load instruction.

4. The processor as recited in claim 1, wherein the ordering violation comprises detection a data barrier instruction older than the first load instruction.

5. The processor as recited in claim 1, wherein the ordering violation comprises receipt by a second load instruction of source data after the first load instruction, wherein the second load instruction targets a same address as the first load instruction, and wherein the second load instruction is older than the first load instruction.

6. A method comprising:
speculatively executing a first load instruction;
determining whether the first load instruction is a cacheable load instruction or a non-cacheable load instruction based on an address space targeted by the first load instruction;
waiting until detecting requested data targeted by the first load instruction is retrieved from lower-level memory and forwarded to one or more of the load queue and a register file before setting a flush and replay indicator in the status information of the load queue for the first load instruction, responsive to determining the first load instruction is a non-cacheable load instruction; and
waiting until detecting a first condition before setting the flush and replay indicator in the status information of the load queue for the first load instruction, responsive to determining the first load instruction is a cacheable load instruction; and
flushing and replaying the first load instruction responsive to detecting the flush and replay indicator is set and an ordering violation has occurred.

7. The method as recited in claim 6, wherein the first condition is one of:
detecting a cache line with data of the first load instruction being evicted from the cache, prior to the first load instruction completing; and receiving a snoop request targeting a cache line with data of the first load instruction, prior to the first load instruction completing.

8. The method as recited in claim 6, wherein responsive to determining the first load instruction is a cacheable load instruction, the method further comprises waiting until detecting requested data targeted by the first load instruction is invalidated in the cache before setting the flush and replay indicator in the status information of the load queue for the first load instruction.

9. The method as recited in claim 6, wherein the ordering violation comprises detecting a data barrier instruction older than the first load instruction.

10. The method as recited in claim 6, wherein the ordering violation comprises a second load instruction receiving source data after the first load instruction, wherein the second load instruction targets a same address as the first load instruction, and wherein the second load instruction is older than the first load instruction.

11. A computing system comprising:
   a memory; and
   a first processor comprising:
      one or more execution units;
      a cache having a plurality of cache lines; and
      a load queue configured to maintain status information for load instructions;
   wherein the first processor is configured to:
      speculatively execute a first load instruction;
      determine whether the first load instruction is a cacheable load instruction or a non-cacheable load instruction based on an address space targeted by the first load instruction;
      wait until detection that requested data targeted by the first load instruction is retrieved from lower-level memory and forwarded to one or more of the load queue and a register file before a flush and replay indicator is set in the status information of the load queue for the first load instruction, responsive to a determination that the first load instruction is a non-cacheable load instruction; and
      wait until detection of a first condition before the flush and replay indicator is set in the status information of the load queue for the first load instruction, responsive to a determination that the first load instruction is a cacheable load instruction; and
      flush and replay the first load instruction responsive to detection that the flush and replay indicator is set and an ordering violation has occurred.

12. The computing system as recited in claim 11, wherein:
   the computing system further comprises a second processor configured to share data stored in the memory with the first processor; and
   the first processor is a coherent processor and the second processor is a non-coherent processor.

13. The computing system as recited in claim 11, wherein the first condition is one of:
   detection of a cache line with data of the first load instruction being evicted from the cache, prior to completion of the first load instruction; and
   receipt of a snoop request that targets a cache line with data of the first load instruction, prior to completion of the first load instruction completing.

14. The computing system as recited in claim 11, wherein the ordering violation comprises detection of a data barrier instruction older than the first load instruction.

* * * * *

UNITED STATES PATENT AND TRADEMARK OFFICE
CERTIFICATE OF CORRECTION

PATENT NO. : 10,747,535 B1
APPLICATION NO. : 15/207115
DATED : August 18, 2020
INVENTOR(S) : Reddy et al.

Page 1 of 1

It is certified that error appears in the above-identified patent and that said Letters Patent is hereby corrected as shown below:

In the Claims

Column 18, Claim 13, Line 30, please delete "completing".

Signed and Sealed this
Twenty-second Day of December, 2020

Andrei Iancu
*Director of the United States Patent and Trademark Office*